United States Patent [19]

Lurwig

[11] Patent Number: 5,450,714

[45] Date of Patent: Sep. 19, 1995

[54] ROTARY CUTTER WITH COUNTERROTATION GEARBOX

[75] Inventor: Fred W. Lurwig, Marion Jct., Ala.

[73] Assignee: Allied Products Corporation, Chicago, Ill.

[21] Appl. No.: 319,937

[22] Filed: Oct. 7, 1994

[51] Int. Cl.⁶ ..................... A01D 34/66; A01D 34/76
[52] U.S. Cl. ........................ 56/13.5; 56/255; 56/DIG. 6; 74/665 GB
[58] Field of Search ............ 56/12.7, 13.5, 255, 56/503, DIG. 6; 74/665 GB

[56] References Cited

U.S. PATENT DOCUMENTS

| | | | |
|---|---|---|---|
| 842,757 | 1/1907 | Blood. | |
| 2,443,027 | 6/1948 | Dishmaker. | |
| 2,504,268 | 4/1950 | Lee | 56/255 |
| 2,614,440 | 10/1952 | Richey. | |
| 2,701,942 | 2/1955 | Caldwell, Jr. et al. | 56/503 X |
| 2,795,914 | 6/1957 | Smith. | |
| 3,385,043 | 5/1968 | Seymore | 56/503 |
| 3,618,304 | 11/1971 | Hundhausen | 56/255 X |
| 4,090,346 | 5/1978 | Doi | 56/255 X |
| 4,196,568 | 4/1980 | Perry | 56/255 X |
| 4,526,180 | 7/1985 | Scott et al. | 56/503 X |
| 4,573,269 | 3/1986 | Hernandez | 56/255 X |
| 4,634,403 | 1/1987 | Peabody et al. | 474/1 |
| 4,900,292 | 2/1990 | Berry et al. | 474/84 |
| 4,926,623 | 5/1990 | Fiener | 56/60 |
| 5,077,959 | 1/1992 | Wenzel | 56/11.1 |
| 5,127,215 | 7/1992 | Wenzel | 56/11.1 |

Primary Examiner—George A. Suchfield
Attorney, Agent, or Firm—Lockwood, Alex, Fitzgibbon & Cummings

[57] ABSTRACT

A rotary cutter apparatus is provided for shredding coarse vegetation in order to generally reduce the size of cut vegetation and more evenly distribute the vegetation once thus cut. Counterrotating, coaxial blade assemblies are provided. One blade assembly is driven by a central shaft rotatably mounted through a drive barrel, which drives the other blade assembly. The central shaft can be mounted by only two bearing assemblies. Easy assembly and disassembly arrangements are also provided. The rotary cutter apparatus is characterized by simplified and cost-reduced manufacturing and by enhanced serviceability.

27 Claims, 3 Drawing Sheets

ROTARY CUTTER WITH COUNTERROTATION GEARBOX

DESCRIPTION

BACKGROUND AND DESCRIPTION OF THE INVENTION

The present invention generally relates to machinery for cutting and shredding vegetation by the use of double-shredding action effected by dual counterrotating blade assemblies. More particularly, the invention is a rotary cutter apparatus which cuts and shreds by blades, some of which rotate in a clockwise direction and others in a counterclockwise direction, and that is particularly designed for cutting down and shredding post-harvest stubble, for clearing fields of coarse vegetation, for mowing and mulching grassy areas, and the like. The invention finds special application in connection with wide-swathed agricultural and commercial rotary cutting equipment.

Rotary cutters are well-known in the agricultural industry. They can vary in size and type including single deck equipment, multiple deck equipment, and equipment having decks that can be tilted up and down for cutting on large contoured fields, for example. Typically, this equipment is pulled by a pulling vehicle such as a tractor and is driven by the power take-off (PTO) shaft of the pulling vehicle. Rotary cutters are especially designed for rugged, heavy-duty use and can often accommodate and cut numerous types of vegetation including thick-stalked plants, saplings, small diameter trees, and the like. Rotary cutters are available in various types and sizes for handling various cutting tasks from general pasture clipping to farm and commercial operations. Often, these are heavy-duty machines built for long hours of rugged cutting.

Present day commercial rotary cutters have either a single blade assembly or have multiple blade assemblies that do not lie along coinciding axes of rotation. Generally speaking, these cutters achieve good cutting results insofar as they sever the vegetation to cut it down. However, this traditional approach has limited effectiveness in shredding the vegetation during the cutting operation. Under many conditions, the cut vegetation passes out of and behind the rotary cutter in large clumps or elongated pieces. The final result can be a cut path that is slow to decompose because of the elongated size and density of the severed vegetation. While some shredding action can occur in order to speed decomposition of the cut vegetation, its effectiveness is limited and adversely affected by vegetation size and type and by cutting conditions.

It has been proposed to provide a rotary cutter having double counterrotating blades in order to attempt to achieve a double-shredding action by the rotary cutter. Objectives include promoting more rapid decomposition, destruction of insects such as boll weevils, corn bores and the like, while improving evenness of spreading for reducing windrowing of the cut vegetation. Such a proposed structure is found in U.S. Pat. No. 3,385,043 to Seymore.

The gearbox and drive train assembly disclosed by the Seymore patent has been found to exhibit defects that seriously impair the mechanical viability, repairability, maintenance and serviceability of the gearbox and drive train. In addition, this proposed cutter requires difficult machining procedures and is very susceptible to misalignment of bearing assemblies, leading to significant reduction in bearing life. For example, the Seymore patent teaches that its center shaft is supported by three bearing assemblies, and they are of the tapered roller bearing type. This entails close machining procedures and tight tolerances and generally complicates and substantially increases the difficulty of adjustment for proper bearing alignment. Also, certain components are welded or force-fit together, which eliminates or seriously restricts adjustability, while also creating situations in which entire assemblies must be replaced because the assemblies cannot be readily disassembled without serious damage to or misalignment of component parts. It will be appreciated that misalignment of and/or damage to drive train components that rotate at a relatively high speed will be detrimental to the equipment, including noise development and working life reduction.

It has been found that, by the improvements embodied in the present invention, these shortcomings and difficulties of units such as those disclosed in the Seymore patent are virtually avoided while still achieving the advantageous objectives that are specified in the Seymore patent with respect to providing double shredding action by co-axial double counterrotating blades.

In summary, the present invention effects these improvements by providing a rotary cutter having at least one deck assembly which supports and houses a gearbox drive assembly for driving both an upper blade assembly and a lower blade assembly which counterrotate with respect to each other along the same axis of rotation in order to achieve the shredding action that is characteristic of the present invention. The blade gearbox drive assembly includes a rotatably mounted drive output shaft which drives the lower blade assembly. Also included is a rotatably mounted driven output tube for driving the upper blade assembly and for receiving the output shaft that passes through the output tube. Only two bearing assemblies mount the output shaft, and these two bearing assemblies preferably are not tapered bearing assemblies. Preferably, the output tube is removably attached to the gearbox drive gear for the upper blade assembly in order to ensure that both the output tube and the drive gear are replaceable without damage to the other. It is also preferred that the drive tube and the upper blade assembly are removably secured to one another.

It is a general object of the present invention to provide an improved rotary cutter with counterrotation gearbox and blade drive assembly.

Another object of this invention is to provide an improved rotary cutter counterrotation gearbox that prevents misalignment of bearings and side loading of drive shafts, while improving bearing life.

Another object of the present invention is to provide an improved rotary cutter counterrotation gearbox that facilitates assembly and serviceability and that avoids situations leading to component damage when disassembly and/or service are required.

Another object of the present invention is to provide an improved rotary cutter having counterrotating dual blade assemblies and including an easy attachment blade assembly for facilitating servicing, repair or replacement of the blade assembly or of its blades.

These and other objects, features and advantages of the present invention will be clearly understood through a consideration of the following detailed description.

BRIEF DESCRIPTION OF THE DRAWINGS

The invention will be further elucidated in the following description with reference to the drawings in which.

DESCRIPTION OF THE PARTICULAR EMBODIMENTS

Figure 1:
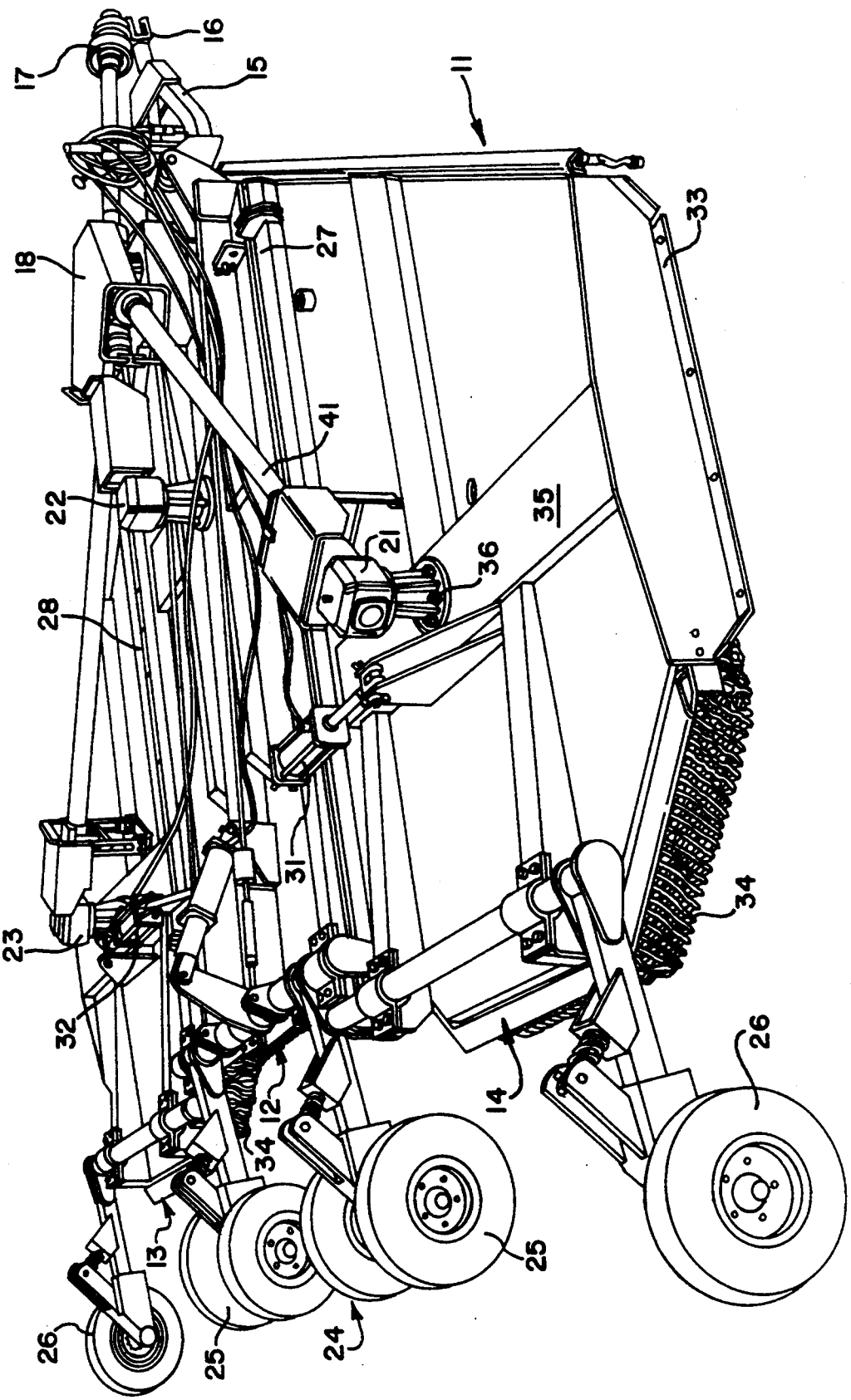
FIG. 1 is a perspective view of a rotary cutter exemplifying a type of rotary cutter within which the present invention can be incorporated.

A rotary cutter, generally designated as 11 in FIG. 1, is illustrative of the type of rotary cutter within which the present invention can be embodied. It will be understand that various other types of rotary cutters can be improved by incorporating the present invention. These include rotary cutters that are of the single deck variety and those which have multiple decks of a lesser or greater number than the three decks shown in the illustrated rotary cutter. The decks may be articulated or not.

With further reference to the illustrated rotary cutter, it is of the multiple-deck variety and includes a center deck assembly 12 and two opposing side deck or wing assemblies 13, 14. A tongue 15 and clevis hitch 16 are provided for securing the illustrated rotary cutter 11 to a pulling vehicle such as a tractor (not shown). A drive shaft assembly 17 receives rotating power from the PTO of the pulling vehicle. A power divider gearbox 18 transfers the rotational power from the PTO source to the individual gearbox assemblies 21, 22, 23.

Travel through fields and the like is facilitated by wheel and axle assembly 24 which includes main body wheels 25 and wing wheels 26. Each wing assembly is secured to the main body or center deck assembly 12 by a hinge assembly 27, 28. Lift cylinders 31, 32 retract and extend in order to raise and lower, respectively, the wings in a well-known manner. Wing skids 33 can be included in order to facilitate movement along the ground. Discharge shields or chain links 34 preferably are included as illustrated.

Figure 2:
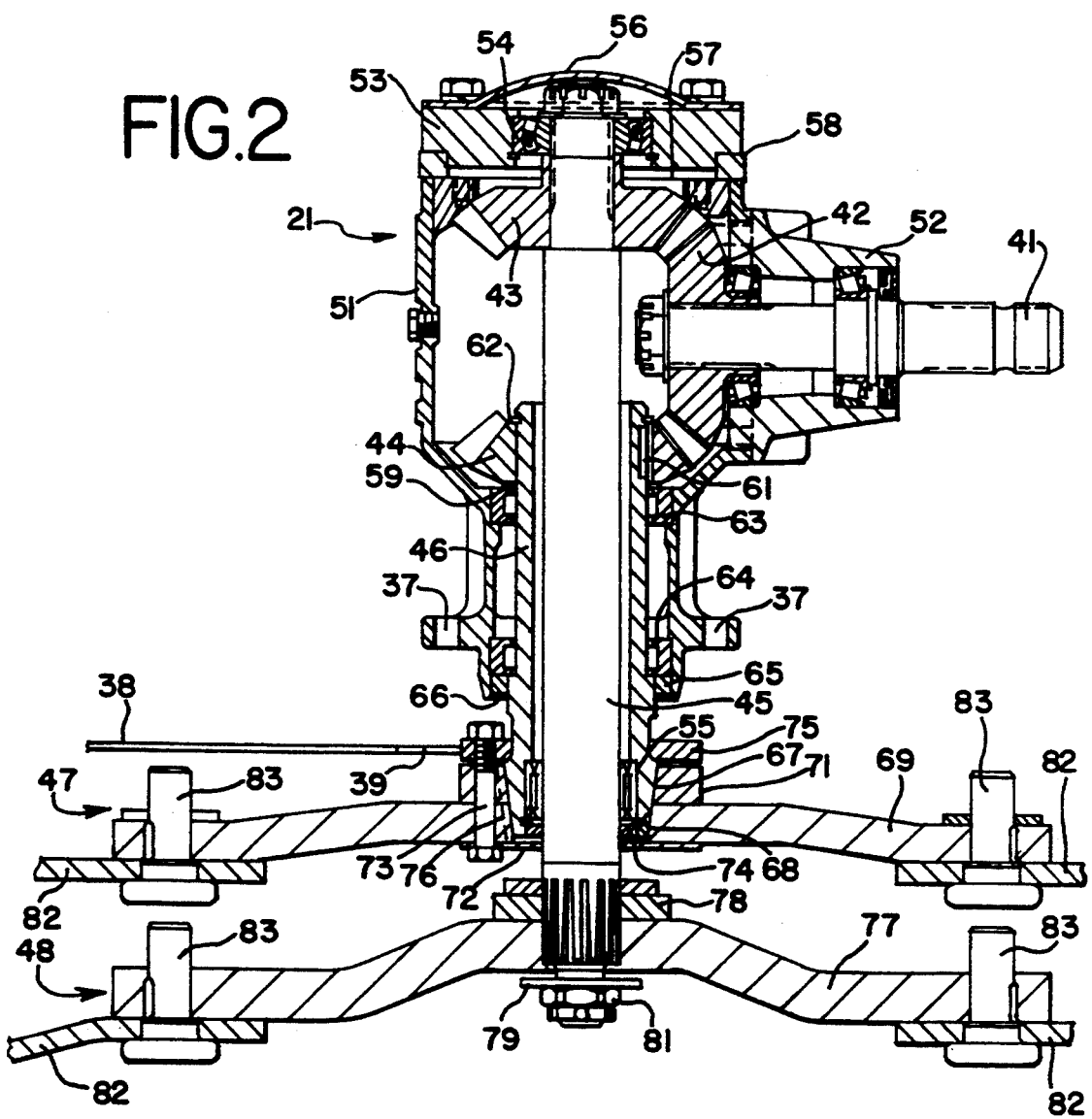
FIG. 2 is a cross-sectional view through one of the gearbox and drive assemblies of the rotary cutter shown in FIG. 1.

During the course of the following description emphasis will be placed upon the gearbox assembly 21 and its associated components. It will be understood that the same structural features are to be found in other gearbox assemblies and associated components in accordance with the present invention. The illustrated deck assembly 14 includes a gearbox stand or raised cross member 35 through which mounting bolts 36 pass for securing the gearbox assembly 21 to the side deck or wing assembly 14, the bolts 36 passing through holes 37 (FIG. 2). A deck plate 38 defines the cutting chamber and accommodates rotation of the blade assemblies such as by incorporating a cut-out 39 therethrough.

Figure 3:
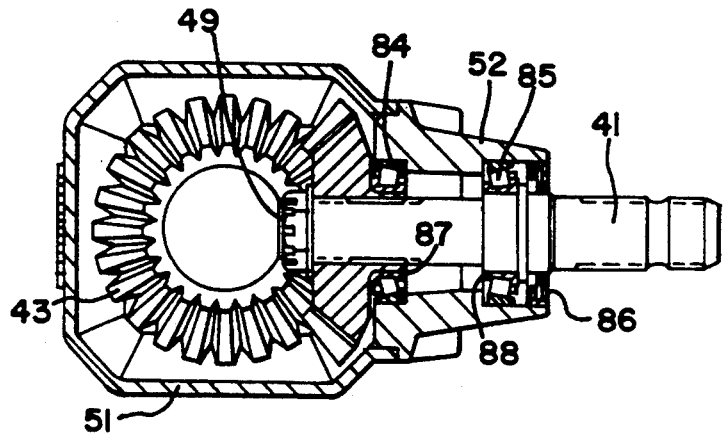
FIG. 3 is a transverse, top cross-sectional view through the gearbox assembly of FIG. 2.

With more particular reference to the gearbox assembly 21, an input shaft 41 transmits the rotative power from the PTO and into the gearbox assembly. As can be seen in FIG. 3, input shaft 41 is secured into place by a suitable assembly means such as the illustrated slotted nut 49. Mounting of the input shaft 41 includes cone bearing assemblies 84, 85, a seal 86 and shim and spacer 87, 88.

In the illustrated embodiment, the gearbox assembly includes a bevel gear drive assembly including a drive gear 42, an upper driven gear 43, and a lower driven gear 44. Upper driven gear is secured to and drives driven output shaft or inner shaft 45, and lower driven gear 44 is secured to and drives driven output tube or outer barrel 46. It will be noted that driven output shaft 45 passes through driven output tube 46.

An upper blade assembly, generally designated as 47, is releasably secured to the driven output tube 46, while a lower blade assembly, generally designated as 48, is secured to the driven output shaft 45. It will be appreciated that, upon rotation of the input shaft 41, the upper driven gear 43 and lower driven gear 44 will rotate in opposite directions along the same axis. This rotational movement is in turn transmitted to the blade assemblies 48, 47, respectively, through the driven output shaft 45 and driven output tube 46, respectively. The result is coaxial counterrotation of the upper blade assembly and lower blade assembly with respect to each other.

Body housing 51 generally encloses the bevel gear assembly and mounts to the gearbox stand or raised cross member 35 of the deck assembly by virtue of the bolts 36 and the holes 37. An input housing 52 is assembled onto body housing 51 and provides support for the input shaft 41. A removable top housing 53 provides ready access to the interior of the gearbox housing assembly.

In an important aspect of the invention, the driven output shaft 45 is mounted within two bearing assemblies 54 and 55. Preferably, these bearing assemblies are of a type different from so-called tapered bearings or tapered roller bearings. Such tapered bearings require fine adjustment to be certain that complementary tapered bearings offset one another so as to prevent up and down movement of the shaft. Preferably, the upper bearing assembly 54 is, as illustrated, a spherical bearing assembly, and the lower bearing assembly 55 is a needle bearing assembly. This combination of a spherical bearing along one end portion of the shaft and a needle bearing along the other end portion of the shaft provides the up and down support required while substantially decreasing and virtually eliminating the need for bearing adjustments. Also, the provision of two bearing assemblies rather three bearing assemblies greatly simplifies machining requirements for the components which mount and which are mounted by these bearing assemblies.

It has been found that, without meticulous adjustment and precision machining, the driven output shaft in a three-bearing arrangement typically will experience side loading, which usually results in reduced life of the bearings. The three bearing approach requires the difficult operation of machining three surfaces on a common axis. Proceeding with the preferred combination of the invention of a spherical bearing assembly and a needle bearing assembly avoids the need for a pair of tapered bearings that have generally matching characteristics. By the approach of the present invention, no bearing adjustment is needed on the inner output shaft. This bearing combination, particularly providing the spherical bearing at the top end portion of the shaft takes the vertical load both upwardly and downwardly. The bearing combination of the invention provides the proper amount of drag for long life and simplified maintenance.

Concerning the illustrated manner of mounting the upper bearing assembly 54, it can conveniently be mounted without a seal inasmuch as a cover 56 can retain oil or other lubrication for contact with the bearing surfaces. Mounting and adjustment can include the use of a retaining ring 57 and one or more shims 58. Shim(s) 59 can also be positioned under the lower driven gear 44. These shims permit upward and downward adjustment of the bevel gears with respect to each other and/or other components of the assembly.

The lower driven bevel gear 44 is removably mounted with respect to the driven outer tube 46 which it drives. In the exemplified mounting arrangement a keyway and key 61 and retaining ring or snap ring 62 retain this assembly in an easily removable yet secure manner. Snap ring 62 positions within the illustrated annular groove in the outer tube or barrel 46. Once the upper and lower bevel gears are shimmed with respect to each other, typically such that each is the same distance from the axis of the drive bevel gear 42, the snap ring can be reinserted into the annular groove. This provides an adjustment feature independent of the bearings. In those instances where a bevel gear becomes worn or damaged, it can be easily assembled to and disassembled from the overall assembly, particularly to and from the driven tube or barrel 46. This disassembly is readily accomplished without having to damage either the bevel gear or the barrel and without having to replace both of them if only one needs replacement or repair. The barrel itself is mounted with bearing assemblies 63, 64. These bearings can, for example, be tapered roller bearings and can include the use of a seal 65 and a dust shield 66.

Referring further to the driven output tube or barrel 46, its bottom end portion includes a tapered surface 67 which tapers downwardly toward the bottom end of the barrel. A complementary tapered passageway 68 is provided along the central axis of the upper blade assembly 47. This tapered passageway 68 is through upper bar or blade holder 69 and hub 71. A shield ring 72 and a plurality of bolts 73 secure the upper bar 69 and thus the upper blade assembly 47 onto the barrel 46 in a removable and secure manner, with a seal 74 typically being included within this assembly. A split ring or collar 75 rests on a shoulder 76. When the bolts 73 are tightened, the blade assembly 47 is locked into place, while still providing an assembly that is easily completed and removed. Disassembly at this tapered engagement area also permits access to the seal 74 and bearing assembly 55 when same are in need of replacement or repair.

Lower blade assembly 48 is removably secured to the driven output shaft 45. Its bar or blade holder 77 is secured to the shaft 45 by being mounted up against a tapered spline 78. A splined assembly is illustrated. The securement means include washer 79 and appropriate nut and cotter pin assembly 81. Each blade 82 is secured to its respective bar 69, 77 in a pivoting manner to permit flail action by way of suitable mounting pins 83.

Figure 4:
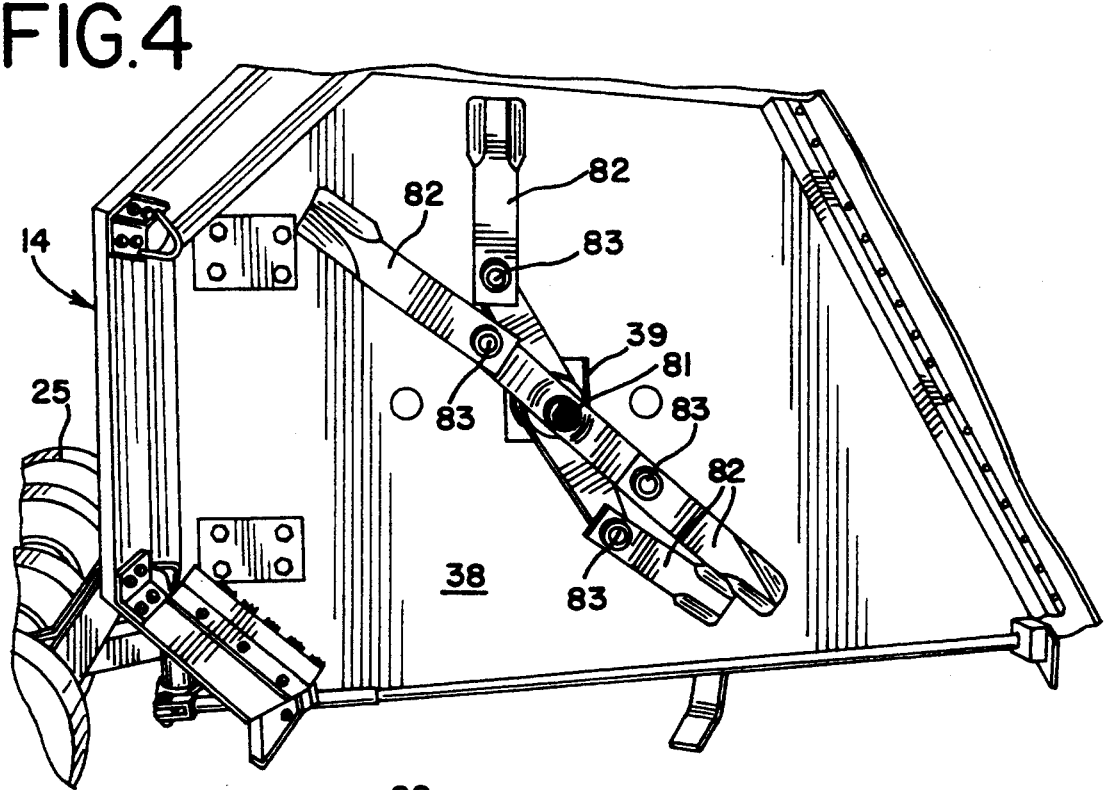
FIG. 4 is a perspective view illustrating one of the pairs of counterrotating blade assemblies of the rotary cutter of FIG. 1 shown with one of its decks tilted in an upright manner.
Figure 5:
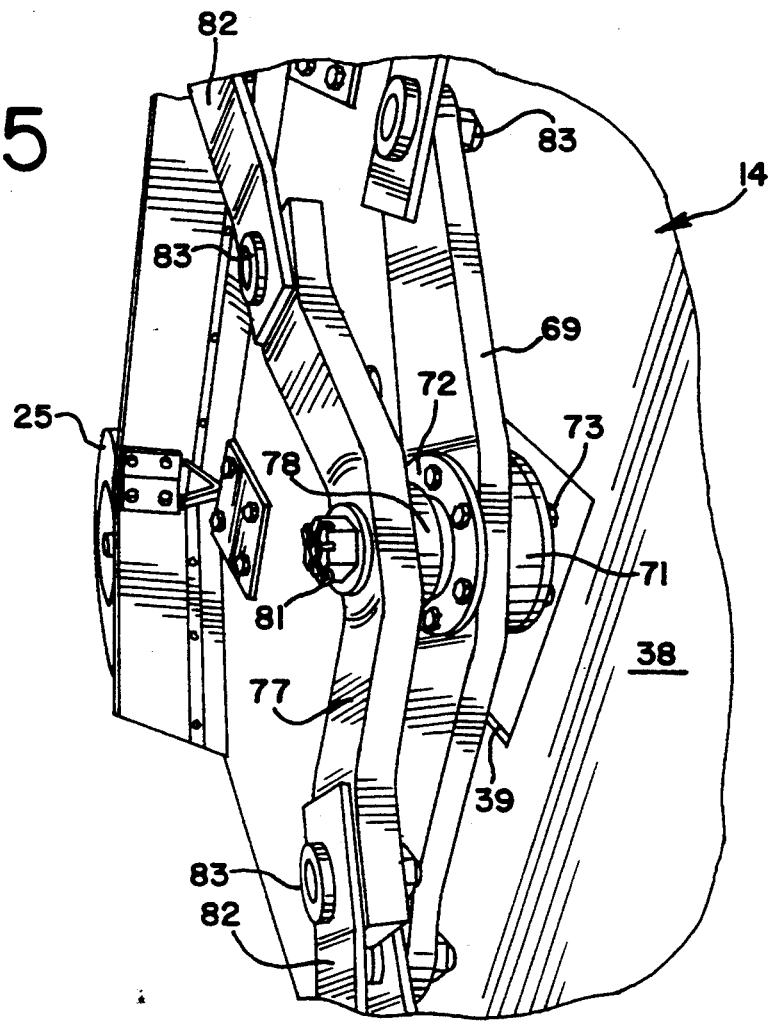
FIG. 5 is a perspective, detail view of the counterrotation drive assembly as illustrated in FIG. 4.

FIG. 4 and FIG. 5 further illustrate the counterrotating blade assemblies within a side deck or wing assembly 14 when in its upwardly disposed or raised position. It will be noted that the flail mounted blades 82 will kick out of the way when a foreign obstacle is encountered.

It will be understood that the embodiments of the present invention which have been described are illustrative of some of the applications of the principles of the present invention. Various modifications may be made by those skilled in the art without departing from the true spirit and scope of the invention.

I claim:

1. A rotary cutter apparatus with dual counterrotating blade assemblies for cutting and shredding coarse vegetation, the rotary cutter apparatus comprising:
   a deck assembly associated with at least one ground engagement member and an assembly for attachment to a pulling vehicle;
   an upper blade assembly rotatably mounted along said deck assembly so as to engage and cut vegetation over which said rotary cutter apparatus moves and which passes generally under said deck assembly;
   a lower blade assembly rotatably mounted along said deck assembly so as to engage and cut vegetation over which said rotary cutter apparatus moves and which passes generally under said deck assembly, said lower blade assembly being below said upper blade assembly;
   a blade gearbox and drive assembly secured to said deck assembly, said blade gearbox and drive assembly simultaneously driving both said upper blade assembly and said lower blade assembly;
   said blade gearbox and drive assembly including a rotatably mounted driven output shaft in driving engagement with said lower blade assembly and a rotatably mounted driven output tube in driving engagement with said upper blade assembly, said output shaft passing through said output tube, and said blade assemblies being driven respectively by said output shaft and output tube in counterrotation with respect to each other;
   said output shaft being mounted within said blade gearbox and drive assembly by only two bearing assemblies which are in axial alignment with each other, neither of said bearing assemblies being a tapered bearing assembly;
   said blade gearbox and drive assembly include a drive gear for the upper blade assembly and a drive gear for the lower blade assembly;
   said output tube being removably attached to said drive gear for the upper blade assembly so that either of said output tube and said drive gear for the upper blade assembly are replaceable without damage to the other; and
   said drive gears for the upper and lower blade assemblies are substantially coaxial and are spaced from one another by an adjustable distance.

2. The rotary cutter apparatus in accordance with claim 1, wherein said output tube and said upper blade assembly are removably secured to one another so that said upper blade assembly is removable without removal of or damage to said output tube or to said upper blade assembly.

3. The rotary cutter apparatus in accordance with claim 1, wherein at least one of said two bearing assemblies mounting the output shaft is a bearing assembly that accepts both upwardly directed and downwardly directed vertical loading of said output shaft.

4. The rotary cutter apparatus in accordance with claim 3, wherein said at least one of said two bearing assemblies is a spherical bearing assembly.

5. The rotary cutter apparatus in accordance with claim 3, wherein one of said bearing assemblies is a spherical bearing assembly, and the other bearing assembly is a needle bearing assembly.

6. The rotary cutter apparatus in accordance with claim 1, wherein one of said bearing assemblies is a spherical bearing assembly, and the other bearing assembly is a needle bearing assembly.

7. The rotary cutter apparatus in accordance with claim 6, wherein said spherical bearing assembly is an upper bearing assembly and said needle bearing assembly is a bottom bearing assembly.

8. The rotary cutter apparatus in accordance with claim 2, wherein said output tube has a downwardly tapering frusto-conical surface and said upper blade assembly has a complementary frusto-conical passageway through which the frusto-conical surface is inserted in a removable manner.

9. The rotary cutter apparatus in accordance with claim 8, wherein a lowermost one of said bearing assemblies is positioned inwardly and generally adjacent to said frusto-conical surface of the output tube.

10. A rotary cutter apparatus with dual counterrotating blade assemblies for cutting and shredding coarse vegetation, the rotary cutter apparatus comprising:
a deck assembly associated with at least one ground engagement member and an assembly for attachment to a pulling vehicle;
an upper blade assembly rotatably mounted along said deck assembly so as to engage and cut vegetation over which said rotary cutter apparatus moves and which passes generally under said deck assembly;
a lower blade assembly rotatably mounted along said deck assembly so as to engage and cut vegetation over which said rotary cutter apparatus moves and which passes generally under said deck assembly, said lower blade assembly being below said upper blade assembly;
a blade gearbox and drive assembly secured to said deck assembly, said blade gearbox and drive assembly simultaneously driving both said upper blade assembly and said lower blade assembly;
said blade gearbox and drive assembly including a rotatably mounted driven output shaft in driving engagement with said lower blade assembly and a rotatably mounted driven output tube in driving engagement with said upper blade assembly, said output shaft passing through said output tube, and said blade assemblies being driven respectively by said output shaft and output tube in counterrotation with respect to each other;
said output shaft being mounted within said blade gearbox and drive assembly by only two bearing assemblies which are in axial alignment with each other; and
said output tube and said upper blade assembly are removably secured to one another so that said upper blade assembly is removable without removal of or damage to said output tube or to said upper blade assembly.

11. The rotary cutter apparatus in accordance with claim 10, wherein at least one of said two bearing assemblies mounting the output shaft is a bearing assembly that accepts both upwardly directed and downwardly directed vertical loading of said output shaft.

12. The rotary cutter apparatus in accordance with claim 11, wherein at least one of said bearing assemblies is a spherical bearing assembly.

13. The rotary cutter apparatus in accordance with claim 11, wherein at least one of said bearing assemblies is a needle bearing assembly.

14. The rotary cutter apparatus in accordance with claim 10, wherein said output tube has a downwardly tapering frusto-conical surface and said upper blade assembly has a complementary frusto-conical passageway through which the frusto-conical surface is inserted in a removable manner.

15. The rotary cutter apparatus in accordance with claim 14, wherein a lowermost one of said bearing assemblies is positioned inwardly and generally adjacent to said frusto-conical surface of the output tube.

16. A rotary cutter apparatus with dual counterrotating blade assemblies for cutting and shredding coarse vegetation, the rotary cutter apparatus comprising:
a deck assembly associated with at least one ground engagement member and an assembly for attachment to a pulling vehicle;
an upper blade assembly rotatably mounted along said deck assembly so as to engage and cut vegetation over which said rotary cutter apparatus moves and which passes generally under said deck assembly:
a lower blade assembly rotatably mounted along said deck assembly so as to engage and cut vegetation over which said rotary cutter apparatus moves and which passes generally under said deck assembly said lower blade assembly being below said upper blade assembly;
a blade gearbox and drive assembly secured to said deck assembly, said blade gearbox and drive assembly simultaneously driving both said upper blade assembly and said lower blade assembly;
said blade gearbox and drive assembly including a rotatably mounted driven output shaft in driving engagement with said lower blade assembly and a rotatably mounted driven output tube in driving engagement with said upper blade assembly, said output shaft passing through said output tube, and said blade assemblies being driven respectively by said output shaft and output tube in counterrotation with respect to each other;
said output shaft being mounted within said blade gearbox and drive assembly by only two bearing assemblies which are in axial alignment with each other, neither of said bearing assemblies being a tapered bearing assembly; and
said output tube and said upper blade assembly are removably secured to one another so that said upper blade assembly is removable without removal of or damage to said output tube or to said upper blade assembly.

17. The rotary cutter apparatus in accordance with claim 16, wherein at least one of said two bearing assemblies mounting the output shaft is a bearing assembly that accepts both upwardly directed and downwardly directed vertical loading of said output shaft.

18. The rotary cutter apparatus in accordance with claim 17, wherein at least one of said bearing assemblies is a spherical bearing assembly.

19. The rotary cutter apparatus in accordance with claim 17, wherein at least one of said bearing assemblies is a needle bearing assembly.

20. The rotary cutter apparatus in accordance with claim 16, wherein said output tube has a downwardly tapering frusto-conical surface and said upper blade assembly has a complementary frusto-conical passageway through which the frusto-conical surface is inserted in a removable manner.

21. The rotary cutter apparatus in accordance with claim 20, wherein a lowermost one of said bearing assemblies is positioned inwardly and generally adjacent to said frusto-conical surface of the output tube.

22. A rotary cutter apparatus with dual counterrotating blade assemblies for cutting and shredding coarse vegetation, the rotary cutter apparatus comprising:

a deck assembly associated with at least one ground engagement member and an assembly for attachment to a pulling vehicle;

an upper blade assembly rotatably mounted along said deck assembly so as to engage and cut vegetation over which said rotary cutter apparatus moves and which passes generally under said deck assembly;

a lower blade assembly rotatably mounted along said deck assembly so as to engage and cut vegetation over which said rotary cutter apparatus moves and which passes generally under said deck assembly, said lower blade assembly being below said upper blade assembly;

a blade gearbox and drive assembly secured to said deck assembly, said blade gearbox and drive assembly simultaneously driving both said upper blade assembly and said lower blade assembly;

said blade gearbox and drive assembly including a rotatably mounted driven output shaft in driving engagement with said lower blade assembly and a rotatably mounted driven output tube in driving engagement with said upper blade assembly, said output shaft passing through said output tube, and said blade assemblies being driven respectively by said output shaft and output tube in counterrotation with respect to each other;

said output shaft being mounted within said blade gearbox and drive assembly by only two bearing assemblies which are in axial alignment with each other, neither of said bearing assemblies being a tapered bearing assembly, wherein one of said bearing assemblies is a spherical bearing assembly, and the other of said bearing assemblies is a needle bearing assembly.

23. The rotary cutter apparatus in accordance with claim 22, wherein said spherical bearing assembly is an upper bearing assembly and said needle bearing assembly is a bottom bearing assembly.

24. A rotary cutter apparatus with dual counterrotating blade assemblies for cutting and shredding coarse vegetation, the rotary cutter apparatus comprising:

a deck assembly associated with at least one ground engagement member and an assembly for attachment to a pulling vehicle;

an upper blade assembly rotatably mounted along said deck assembly so as to engage and cut vegetation over which said rotary cutter apparatus moves and which passes generally under said deck assembly;

a lower blade assembly rotatably mounted along said deck assembly so as to engage and cut vegetation over which said rotary cutter apparatus moves and which passes generally under said deck assembly, said lower blade assembly being below said upper blade assembly;

a blade gearbox and drive assembly secured to said deck assembly, said blade gearbox and drive assembly simultaneously driving both said upper blade assembly and said lower blade assembly;

said blade gearbox and drive assembly include a rotatably mounted driven output shaft in driving engagement with said lower blade assembly and a rotatably mounted driven output tube in driving engagement with said upper blade assembly, said output shaft passing through said output tube, and said blade assemblies being driven respectively by said output shaft and output tube in counterrotation with respect to each other;

said blade gearbox and drive assembly including a drive gear for the upper blade assembly and a drive gear for the lower blade assembly;

said output tube being removably attached to said drive gear for the upper blade assembly so that either of said output tube and said drive gear for the upper blade assembly are replaceable without damage to the other; and said drive gears for the upper and lower blade assemblies are substantially coaxial and are spaced from one another by an adjustable distance.

25. The rotary cutter apparatus in accordance with claim 24, wherein said output tube and said upper blade assembly are removably secured to one another so that said upper blade assembly is removable without removal of or damage to said output tube or to said upper blade assembly.

26. The rotary cutter apparatus in accordance with claim 24, wherein said output tube has a downwardly tapering frusto-conical surface and said upper blade assembly has a complementary frusto-conical opening through which the frusto-conical surface is inserted in a removable manner.

27. The rotary cutter apparatus in accordance with claim 26, wherein a lowermost one of said bearing assemblies is positioned inwardly and generally adjacent to said frusto-conical surface of the output tube.

* * * * *

UNITED STATES PATENT AND TRADEMARK OFFICE
CERTIFICATE OF CORRECTION

PATENT NO. : 5,450,714
DATED      : September 19, 1995
INVENTOR(S) : Fred W. Lurwig It is certified that error appears in the above-indentified patent and that said Letters Patent is hereby corrected as shown below:

```
Col. 3, lines 25-26, "understand" should read --understood--.
Col. 4, line 50, "rather three" should read --rather than three--.
Col. 8, line 28, replace colon ":", with a semicolon --;--; lines
     32-33, "assembly said" should read --assembly, said--.
```

Signed and Sealed this

Twenty-ninth Day of October 1996

Attest:

BRUCE LEHMAN

Attesting Officer   Commissioner of Patents and Trademarks